United States Patent
Giese et al.

(10) Patent No.: US 7,383,931 B2
(45) Date of Patent: Jun. 10, 2008

(54) SYNCHRONIZING DEVICE FOR SHIFTABLE TRANSMISSIONS

(75) Inventors: Manfred Giese, Weilheim (DE); Peter Echtler, Schongan (DE)

(73) Assignee: Hoerbiger Antriebstechnik GmbH, Schongau (DE)

( * ) Notice: Subject to any disclaimer, the term of this patent is extended or adjusted under 35 U.S.C. 154(b) by 294 days.

(21) Appl. No.: 11/173,710

(22) Filed: Jun. 30, 2005

(65) Prior Publication Data

US 2006/0011440 A1    Jan. 19, 2006

(30) Foreign Application Priority Data

Jun. 30, 2004    (DE) ................. 20 2004 010 293 U

(51) Int. Cl.
*F16D 23/06* (2006.01)
(52) U.S. Cl. .................. 192/53.341; 192/53.34
(58) Field of Classification Search ........... 192/53.341, 192/53.342, 53.343, 53.34
See application file for complete search history.

(56) References Cited

U.S. PATENT DOCUMENTS

| 2,179,568 | A | * | 11/1939 | White ............... 192/53.342 |
| 2,676,684 | A | * | 4/1954 | Armantrout ........... 192/53.343 |
| 2,864,476 | A | | 12/1958 | Ashauer et al. |
| 3,247,937 | A | | 4/1966 | Ivanchich |
| 4,566,568 | A | * | 1/1986 | Yant ...................... 192/53.341 |
| 4,584,892 | A | * | 4/1986 | Hiraiwa et al. ............... 74/339 |
| 5,211,068 | A | * | 5/1993 | Spitale et al. ................. 74/339 |
| 5,887,688 | A | * | 3/1999 | Ploetz et al. ........... 192/53.341 |

FOREIGN PATENT DOCUMENTS

| DE | 10343074 | 4/2005 |
| EP | 0319233 | 6/1989 |

* cited by examiner

*Primary Examiner*—Rodney H Bonck
(74) *Attorney, Agent, or Firm*—Sheridan Ross P.C.

(57) ABSTRACT

A synchronizing device for shiftable transmissions, comprising a synchronizer which is non-rotatably supported on a gear shaft and which comprises at least one recess for at least one thrust member. A sliding sleeve is arranged on the synchronizer and displaceable in the longitudinal direction of the gear shaft. A sliding wheel is provided for each shiftable gear, which is arranged on the gear shaft and non-rotatably connected to a coupling body. A friction element comprises at least one outer ring for each sliding wheel. An indexing element is arranged on the outer ring for defining the stop position thereof relative to the synchronizer, wherein the indexing element comprises at least one separate stop member arranged above the recess of the thrust member between the synchronizer and the outer ring.

17 Claims, 3 Drawing Sheets

SYNCHRONIZING DEVICE FOR SHIFTABLE TRANSMISSIONS

The present invention relates to a synchronizing device for shiftable transmissions.

Such synchronizing devices or synchronizer systems, which are available on the market, predominantly use friction systems which by means of cams on the outer ring ensure the indexing of the friction ring or the friction system. In this context, indexing means the stop position of the outer ring of the friction system relative to the synchronizer. Furthermore, synchronizing means with indexing by way of engagement or entrainment pieces in the inner diameter area of the outer ring and in the tooth area of the locking toothing are known. In the last-mentioned system, extended portions provided on the hub, which engage into free-cut tooth segments of the friction ring, serve as a stop for the outer ring or friction system.

The drawback of the known systems, particularly of the last-mentioned system, is the fact that the manufacture of the hub or synchronizer poses problems and is thus expensive, for a press is needed for producing a corresponding hub from steel sinter material, the press being able to realize four independent press planes at both hub sides. Such a press, however, is presently not available on the market. Thus the fourth necessary plane must be machined, as is in principle also true for forged hubs, and it is thus manufactured at high costs.

It is therefore the object of the present invention to provide a synchronizing device for shiftable transmissions of the type whose construction is considerably simplified and which permits a conventional manufacture of the synchronizer or hub.

According to the invention at least one stop member, but normally three stop members are used as the indexing means, said stop member being arranged above the thrust member or above the recess for the thrust member in the synchronizer, and said stop member being supported on both the synchronizer and the outer ring in a form-locked manner, thereby permitting the necessary indexing of the outer ring or the whole frictions system relative to the synchronizer or hub.

The special advantage of the synchronizing device according to the invention is that the synchronizer can still be produced in the conventional way both as a sintered and forged part without any troublesome finishing work. Moreover, this results in the advantage that the synchronizing device according to the invention has a so-called outside indexing which in comparison with inside indexing prevents a weakening of the synchronizer by the provision of corresponding stops.

Further details, features and advantages of the present invention will become apparent from the following description of an embodiment taken in conjunction with the drawing, in which.

Figure 2:
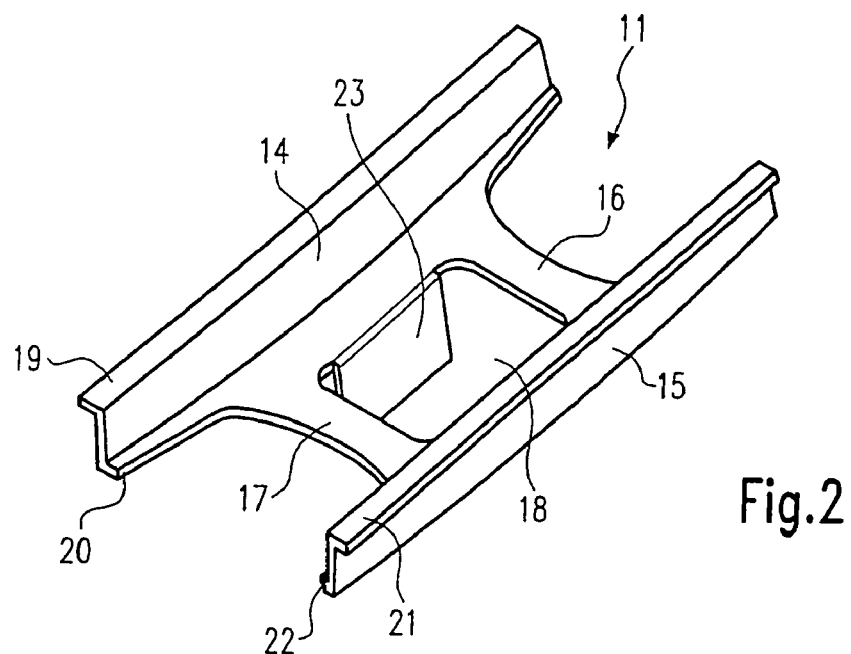
FIG. 2 is a perspective view of an inventive stop member of the synchronizing device according to the invention.
Figure 3:
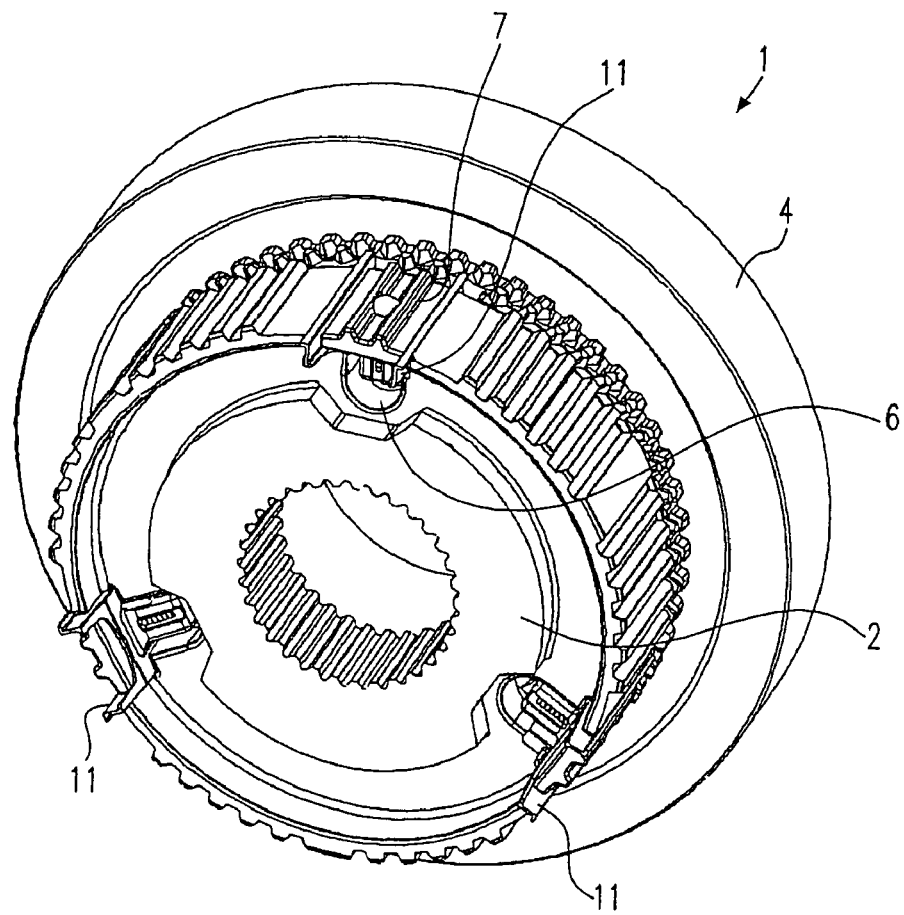
Figure 4:
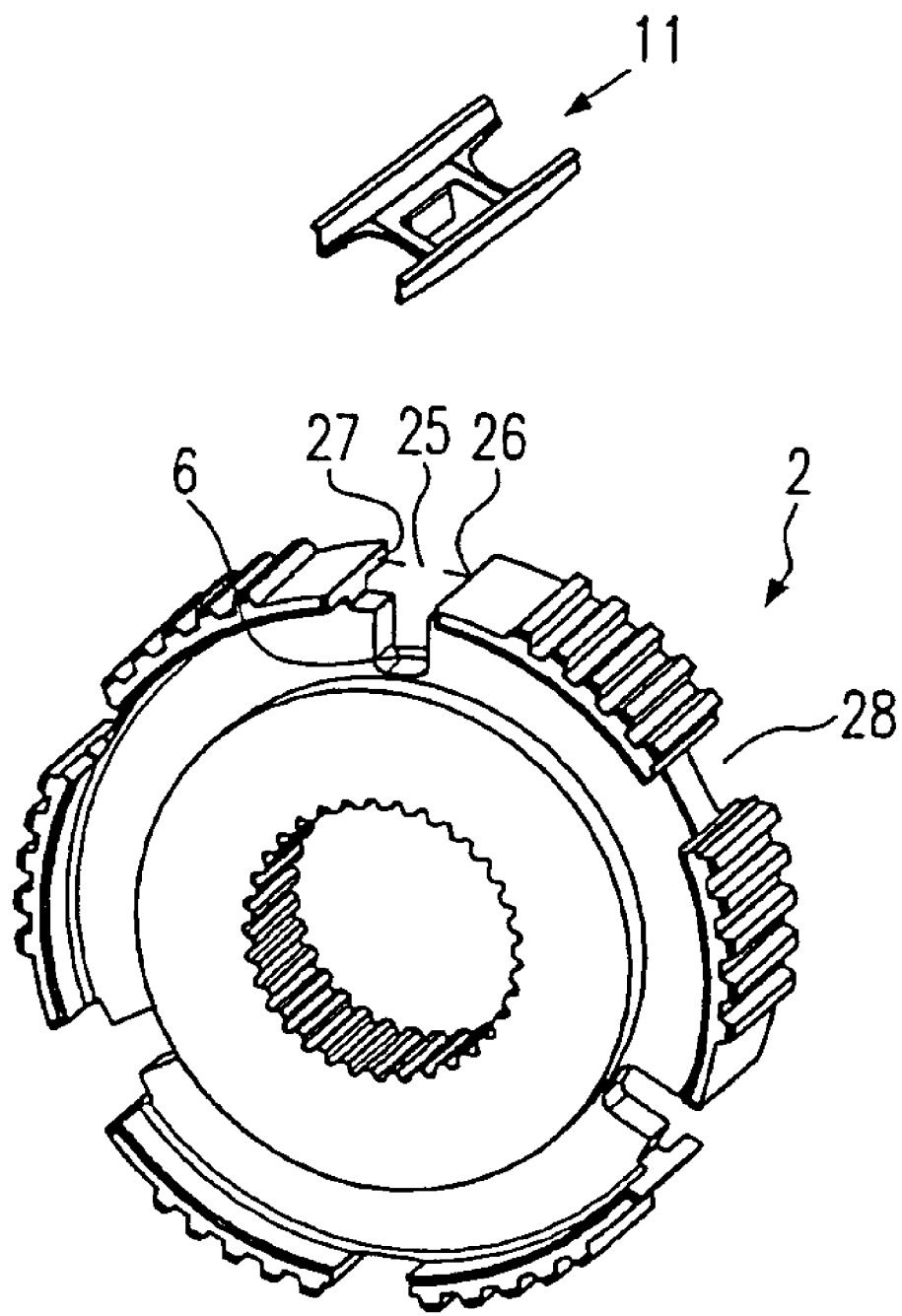

FIG. 3 is an illustration, corresponding to FIG. 2, for illustrating the support of the stop member on synchronizer and outer ring, where, however, the sliding sleeve, a front speed-change gear, a front coupling body, the front friction members and the synchronizer ring have been omitted for a better illustration of the position of the stop plate; and FIG. 4 is a perspective illustration of a synchronizer or a hub of the synchronizing device according to the invention.

Figure 1:
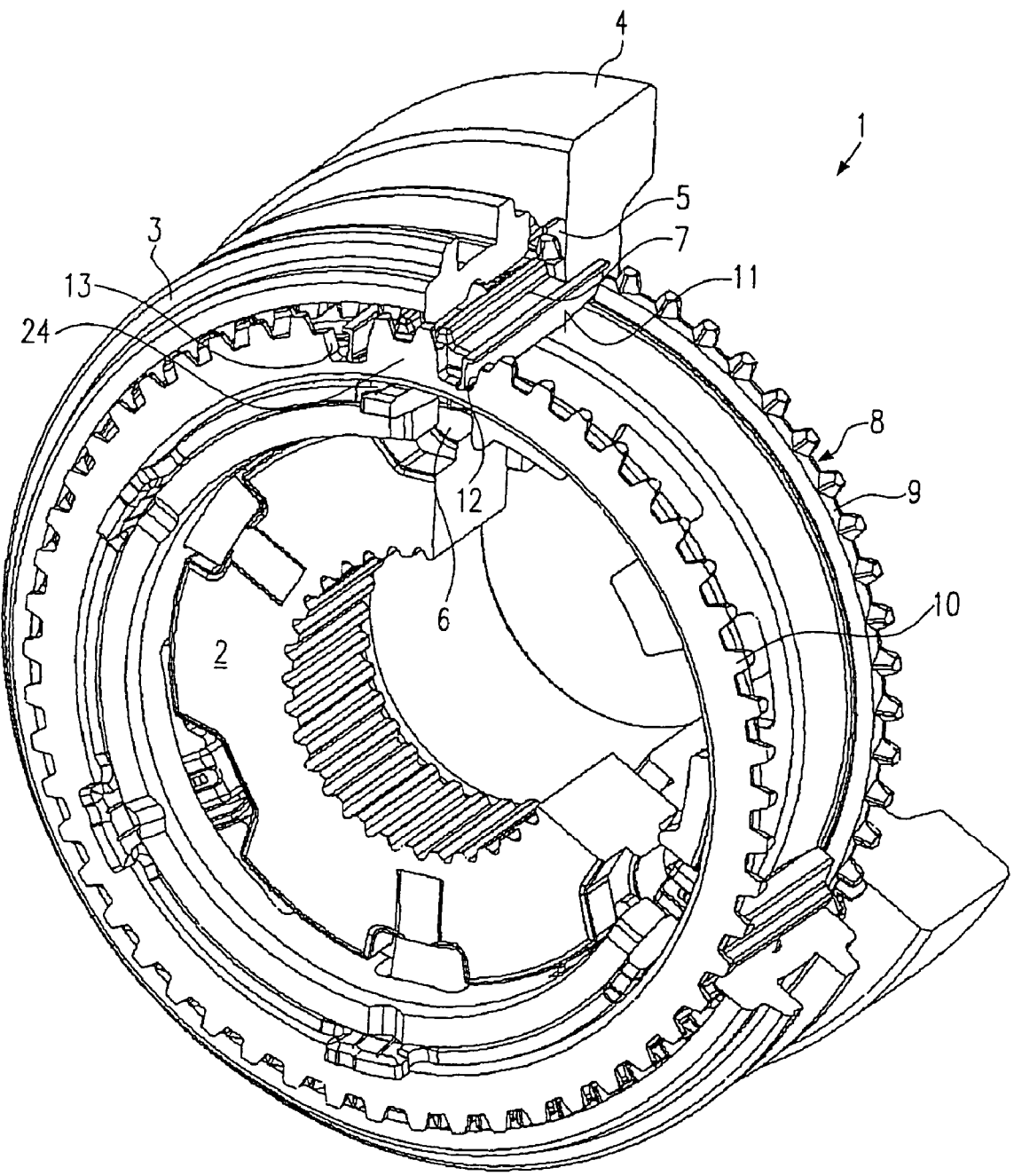
FIG. 1 is a perspective, partly sectional view of a part of a synchronizing device according to the invention.

FIG. 1 shows an embodiment of an inventive synchronizing device 1 which first of all comprises a synchronizer or hub 2 which is non-rotatably supported on a gear shaft (not shown in greater detail).

The synchronizer 2 comprises at least one recess 6 for a thrust member 7. However, in the illustrated and particularly preferred embodiment, three similar recesses are provided that are normally configured in the manner of a T with a rounded bottom, and, as a consequence, three thrust members. For illustrating the principles of the present invention reference is however only made to the recess provided with reference numeral 6 and to the thrust member marked with reference numeral 7.

The synchronizer 2 has arranged thereon a sliding sleeve 3 which is displaceable in the longitudinal direction of the gear shaft (not shown in more detail) and configured in the standard way.

In gear transmissions of the type in question, a sliding wheel is provided each shiftable gear, said sliding wheel being arranged to be rotatable relative to the gear shaft and non-rotatably fixed by the shifting operation relative to the gear shaft. FIG. 1 only shows one sliding wheel (4) of a gear because of the partial view, said sliding wheel being provided with a non-rotatably arranged and associated coupling body 5.

Furthermore, the synchronizing device 1 of the invention comprises a friction means 8, of which FIG. 1 just shows two outer rings 9 and 10. The outer ring 9 is here assigned to the sliding wheel 4, whereas the outer ring (10) is assigned to a further sliding wheel which is arranged on the gear shaft for another gear, but which is not shown in more detail for the sake of clarity. As illustrated in FIG. 1, the outer rings 9 and 10 are disposed due to this arrangement at both sides of the synchronizer 2, viewed in the longitudinal direction of the gear shaft (which is not shown in more detail). The two outer rings 9, 10 may preferably be formed as draw parts.

Furthermore, it is possible that the friction means comprises a friction ring and an inner ring in the standard way. These are however not shown in more detail in FIG. 1 because they are not important for the explanation of the principles of the present invention.

Furthermore, the inventive synchronizing device 1 comprises an indexing means which serves to define the stop position of the outer rings 9 and 10 relative to the synchronizer 2.

In the illustrated embodiment, said indexing means comprises stop members 11, of which FIG. 1 only shows one stop member, but FIG. 3 depicts three stop members 11. It is however preferred that three stop members of that type are provided.

As illustrated in FIG. 1, the stop member 11 is configured in the form of a tub and engages into two corresponding recesses of the outer rings 9 and 10, respectively, only the recesses 12 and 13 of the outer ring 10 being visible in FIG. 1. Said two recesses 12 and 13 are arranged in the vicinity of a pair of teeth 24 of the outer toothing of the outer ring 10. The stop member 11 bridges the distance between the two neighboring outer rings 9 and 10, so that it fixes both outer rings 9 and 10 relative to the synchronizer 2 in definable stop positions.

FIG. 2 shows one of the stop members 11 in detail. The stop member 11 has a tub-like configuration and, when viewed from above, it is approximately shaped as an H.

To this end the stop member 11 comprises two spaced-apart side walls 14 and 15 which are connected by means of two cross members 16 and 17. FIG. 2 shows that the two cross members 16 and 17 are spaced apart from each other and adjoin the side walls 14 and 15 at the lower edge thereof substantially at a right angle, resulting in the tub-like configuration.

FIG. 2 further shows that the side walls 14 and 15 and the cross members 16 and 17 define a recess 18 of a substantially rectangular contour. In the mounted state said recess 18 accommodates the head of the respectively assigned thrust member of the synchronizer 2.

FIG. 2 further illustrates that longitudinal webs extend at each of the free ends of the two side walls 14 and 15, the side wall 14 being provided with the longitudinal webs 21 and 22 and the side wall 15 with the longitudinal webs 19 and 20. The longitudinal webs extend in opposite directions, resulting, when viewed in cross section, in a Z-shaped configuration of the arrangement of the side walls 14 and 15 with their respective longitudinal webs 21 and 22 and 19 and 10, respectively.

FIG. 2 also illustrates that each of the cross members 16 and 17 passes into the lower longitudinal webs 20 and 22, respectively, and that the lower longitudinal web 20 in the area of the recess 18 has arranged thereat a downwardly protruding plate 23 which is substantially shaped as a rectangle. Said plate 23 serves to fix the stop member 11 against axial displacement. To this end it is supported in the installed state on a web of the synchronizer 2. If three stop members 11 are provided in an inventive synchronizing device, all are configured in the previously described embodiment which has been explained with reference to FIG. 2. In addition to the preceding description, explicit reference is here made to the drawing of FIG. 2 as regards the disclosure of the shape and configuration of the stop plate 11. FIG. 4 once again shows the synchronizer 2 of the synchronizing device 1 according to the invention for illustrating its construction as an individual member. The illustration shows that the synchronizer 2 comprises additional grooves 25 provided above the recess 6 for the thrust member, into which the stop plate 11 can be inserted. As a consequence, the boundary walls 26 and 27 of these preferably rectangular grooves 25 are the stop surfaces for the stop member 11. The other grooves above the corresponding recesses provided for the thrust members are configured accordingly.

Furthermore, the illustrated embodiment optionally comprises recesses 28 which, like groove 25, are arranged in the area of the outer toothing of the synchronizer 2 into which stop members can preferably be inserted for providing an axial stop possibility for the sliding sleeve.

LIST OF REFERENCE NUMERALS

1 Synchronizing device
2 Synchronizer
3 Sliding sleeve
4 Sliding wheel
5 Coupling body
6 Recess for the thrust member
7 Thrust member
8 Friction means
9, 10 Outer ring
11 Stop member
12, 13 Stop recesses
14, 15 Side walls
16, 17 Cross members
18 Recess for the thrust member
19-22 Longitudinal webs
23 Plate
24 Pair of teeth
25 Grooves
26, 27 Stop surfaces
28 Recesses in the outer gear rim of the synchronizer 2

The invention claimed is:

1. A synchronizing device for shiftable transmissions, having a plurality of shiftable gears comprising:
   a synchronizer which is non-rotatably supported on a gear shaft and which comprises at least one recess for at least one thrust member;
   a sliding sleeve which is arranged on the synchronizer and displaceable in the longitudinal direction of the gear shaft;
   a sliding wheel for each shiftable gear, which is arranged on the gear shaft and non-rotatably connected to a coupling body;
   a friction means which comprises at least one outer ring for each sliding wheel;
   and an indexing means which is arranged on the outer ring for defining the stop position thereof relative to the synchronizer, characterized in that the indexing means comprises at least one separate stop member arranged above the recess of the thrust member between the synchronizer and the outer ring, respectively.

2. The synchronizing device according to claim 1, characterized in that the stop member, viewed in the longitudinal direction of the gear shaft, bridges the distance between said at least one outer ring wherein said at least one outer ring comprises two outer rings arranged at both sides of the synchronizer.

3. The synchronizing device according to claim 2, characterized in that the stop member engages into stop recesses of the outer ring.

4. The synchronizing device according to claim 2, characterized in that the stop member is configured as a deep-draw sheet metal part.

5. The synchronizing device according to claim 2, characterized in that the stop member comprises two side walls extending substantially in parallel with each other, which are connected by means of two cross members extending in a direction transverse to the side walls.

6. The synchronizing device according to claim 2, characterized in that the stop member comprises a plate to prevent axial displacement thereof, which in the installed state is supported on a web of the synchronizer.

7. The synchronizing device according to claim 1, characterized in that the stop member engages into stop recesses of the outer ring.

8. The synchronizing device according to claim 1, characterized in that the stop member is configured as a deep-draw sheet metal part.

9. The synchronizing device according to claim 1, characterized in that the stop member comprises two side walls extending substantially in parallel with each other, which are connected by means of two cross members extending in a direction transverse to the side walls.

10. The synchronizing device according to claim 9, wherein the cross members are spaced apart and the side walls define a recess for a head or shaft of the associated thrust member.

11. The synchronizing device according to claim 10, characterized in that the side wall is provided at its free ends with longitudinal webs, which are protruding at a right angle and are oriented in opposite directions.

12. The synchronizing device according to claim 10, characterized in that the stop member is approximately shaped in the form of an H.

13. The synchronizing device according to claim 10, characterized in that the stop member has a tub shaped configuration.

14. The synchronizing device according to claim 9 characterized in that each side wall is provided at its free ends with longitudinal webs, which are protruding at a right angle and are oriented in opposite directions.

15. The synchronizing device according to claim 9, characterized in that the stop member, is approximately shaped in the form of an H.

16. The synchronizing device according to claim 9, characterized in that the stop member has a tub shaped configuration.

17. The synchronizing device according to claim 1, characterized in that the stop member comprises a plate used for fixation against axial displacement, which in the installed state is supported on a web of the synchronizer.

* * * * *